(12) United States Patent
Krizan et al.

(10) Patent No.: US 7,419,170 B2
(45) Date of Patent: Sep. 2, 2008

(54) ADJUSTABLE MONITOR CART

(76) Inventors: Dennis Theodore Krizan, 6018 W. National Ave., West Allis, WI (US) 53214; Jon T. Erickson, N69W6459 Bridge Rd., Cedarburg, WI (US) 53012

( * ) Notice: Subject to any disclaimer, the term of this patent is extended or adjusted under 35 U.S.C. 154(b) by 53 days.

(21) Appl. No.: 11/394,289

(22) Filed: Mar. 31, 2006

(65) Prior Publication Data
US 2007/0235968 A1 Oct. 11, 2007

(51) Int. Cl.
*B62B 3/02* (2006.01)
(52) U.S. Cl. ............. 280/79.7; 280/79.11; 280/47.35; 280/651
(58) Field of Classification Search .......... 280/79.7, 280/79.11, 47.35
See application file for complete search history.

(56) References Cited

U.S. PATENT DOCUMENTS

| | | | | |
|---|---|---|---|---|
| 3,552,761 A | * | 1/1971 | Sjoblom | 280/42 |
| 4,278,244 A | * | 7/1981 | Carter | 269/17 |
| 4,978,132 A | * | 12/1990 | Wilson et al. | 280/47.131 |
| 5,288,090 A | * | 2/1994 | Bross | 280/79.7 |
| 5,505,425 A | * | 4/1996 | Shelton | 248/670 |
| 5,599,031 A | * | 2/1997 | Hodges | 280/79.11 |
| 5,660,637 A | * | 8/1997 | Dodge | 118/500 |
| 5,738,365 A | * | 4/1998 | McCarthy | 280/651 |
| 5,924,577 A | * | 7/1999 | Gessert | 211/41.1 |
| 6,109,644 A | * | 8/2000 | Cox | 280/652 |
| 6,231,034 B1 | * | 5/2001 | Walker et al. | 269/17 |
| 6,296,262 B1 | * | 10/2001 | Skinner | 280/79.7 |
| 6,308,969 B1 | * | 10/2001 | Young | 280/79.7 |
| 6,419,245 B1 | * | 7/2002 | Trimble | 280/79.11 |
| 6,505,844 B2 | * | 1/2003 | Hallman et al. | 280/79.7 |
| 6,511,082 B2 | * | 1/2003 | Shirai | 280/79.11 |
| 6,786,503 B1 | * | 9/2004 | Young | 280/656 |
| 6,923,468 B1 | * | 8/2005 | Barnett et al. | 280/651 |
| 7,219,905 B1 | * | 5/2007 | Wilson | 280/79.7 |
| 2004/0256819 A1 | * | 12/2004 | Sorensen | 280/79.11 |

* cited by examiner

*Primary Examiner*—Jeffrey J Restifo

(57) ABSTRACT

Size altering transportation monitor cart whose horizontal width can be expanded or retracted by pulling stopper pins and pulling or pushing the horizontal frame open, closed or to a varying degree between opened or closed.

1 Claim, 10 Drawing Sheets

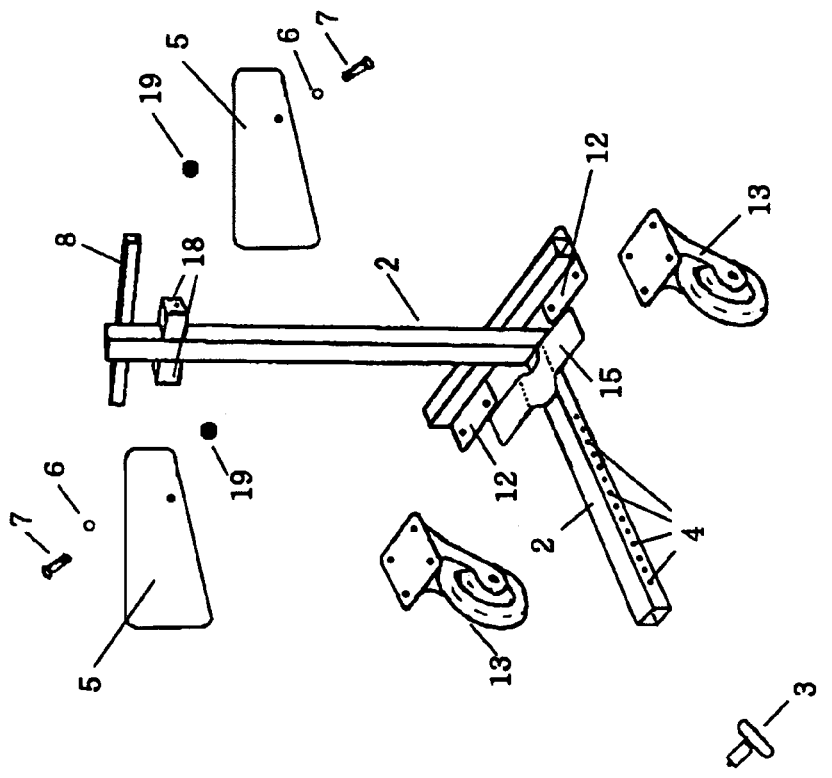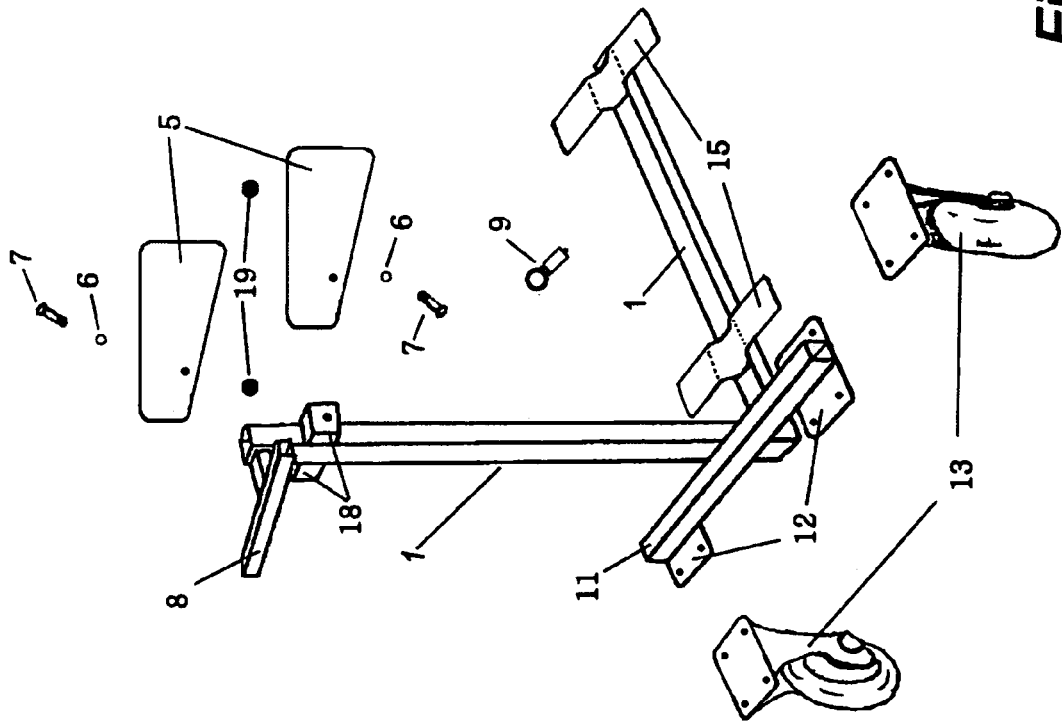
Fig. 8

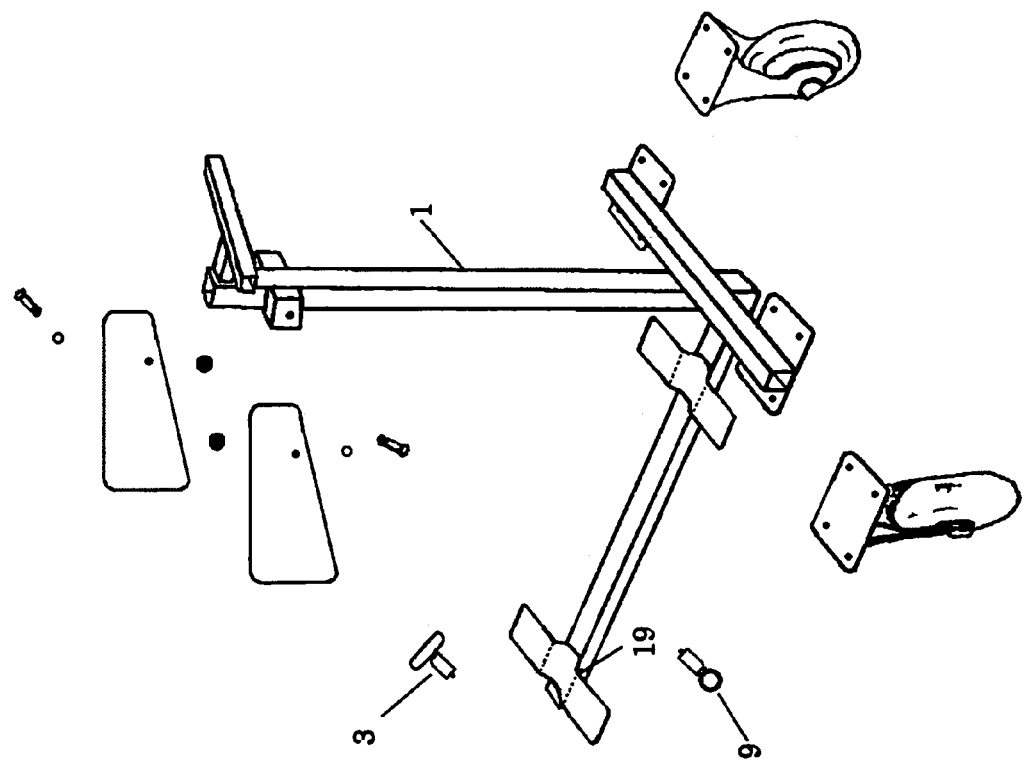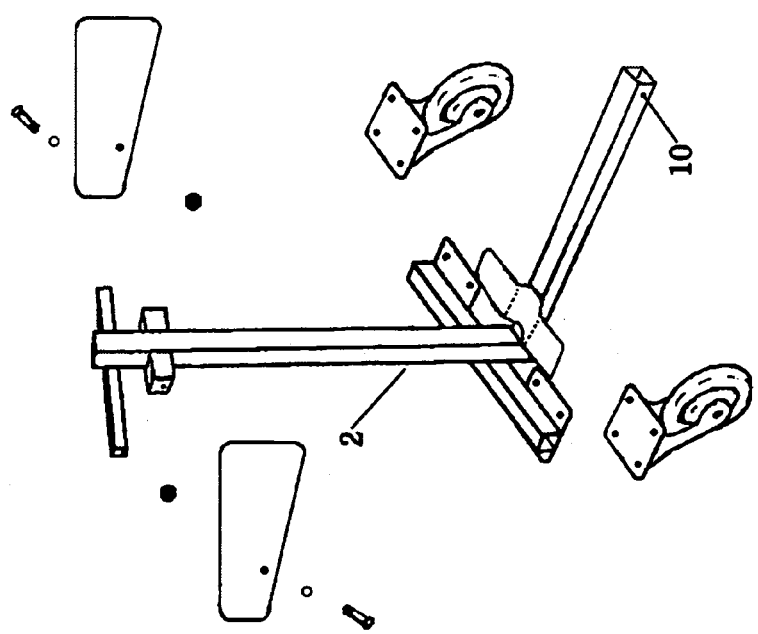
Fig. 9 ated cart according to a preferred embodiment of the present invention wherein all upper supports or pivotable support flags (5) are in the lowered position. Pivoting on pivot bolt (6) tensioned by spring washer (7). The rear top of support flags (5) butt up against the bottom of handles (8) holding them in place. Dropping out of place, is prevented by spring washer (7). Better detail of this is shown in FIG. 10 detailed description. Spring loaded locking pin (3) on lower, horizontal section of L frame (1) is in a locked condition through locking holes (4) on opposite lower, horizontal section of L frame (2) securing width of carrier in a partially expanded state.

ADJUSTABLE MONITOR CART

BACKGROUND OF THE INVENTION

The present invention relates to an improvement of a hand truck or cart to properly and safely carry a thin, fragile monitor of varying sizes. The disadvantage with existing carts is none can safely carry a thin, fragile monitor of varying lengths, sizes and weights, whether it is Liquid Crystal Display (LCD), Light Emitting Diode (LED), Plasma, Digital Light Processing (DLP) or an unknown technology yet to come. These are all a rather new technology, explaining why no proper carrier has been invented until ours. Until the inconvenience of carrying a thin, fragile monitor of varying lengths, sizes and weights is solved, people will need to continue carrying them by hand or balance them on a conventional cart. The larger units can weigh over 100 pounds and all monitors are fragile, presenting a risk of damage to the unit and or to the person or persons carrying it. This will continue to cost more in company expenses to absorb losses including: insurance claims for damaged units and workers compensation claims for workers injured carrying the units.

SUMMARY OF THE INVENTION

In order to rectify the existing disadvantages of the conventional carts as described, the applicants have been consistently and continuously making efforts to develop and improve the type of cart required for this need. With the applicants' accumulated experience and intelligent skills in the field, the applicants finally devised an expandable cart capable of safely carrying a variety of thin, fragile monitors of varying lengths, sizes and weights in an upright position. It is an object of the present invention to provide an expandable cart, which has the ability to safely carry a variety of thin, fragile monitors of varying lengths, sizes and weights. It is another object of the present invention to provide an expandable cart that can be adjusted to size according to the dimensions of the monitor or object to be loaded. The load stage size is adjusted by the operation of a set pin that can be released to allow the stage made up of a horizontal telescoping slip fit tube to be expanded or contracted to the proper size. It is a further object of the present invention to provide an expandable, collapsible monitor cart made of a strong enough and lightweight enough material to hold the load safely and minimize cart weight. Keeping assembly to a minimum to reduce production and shipping costs.

BRIEF DESCRIPTION OF THE DRAWINGS

FIG. 8 is a three dimensional, side perspective, exploded view showing the components of the expandable and retractable cart according to the present invention.

FIG. 9 is a three dimensional, opposite side perspective, exploded view showing the components of the expandable and retractable cart according to the present invention.

DETAILED DESCRIPTION OF THE PREFERRED EMBODIMENT

Figure 1:
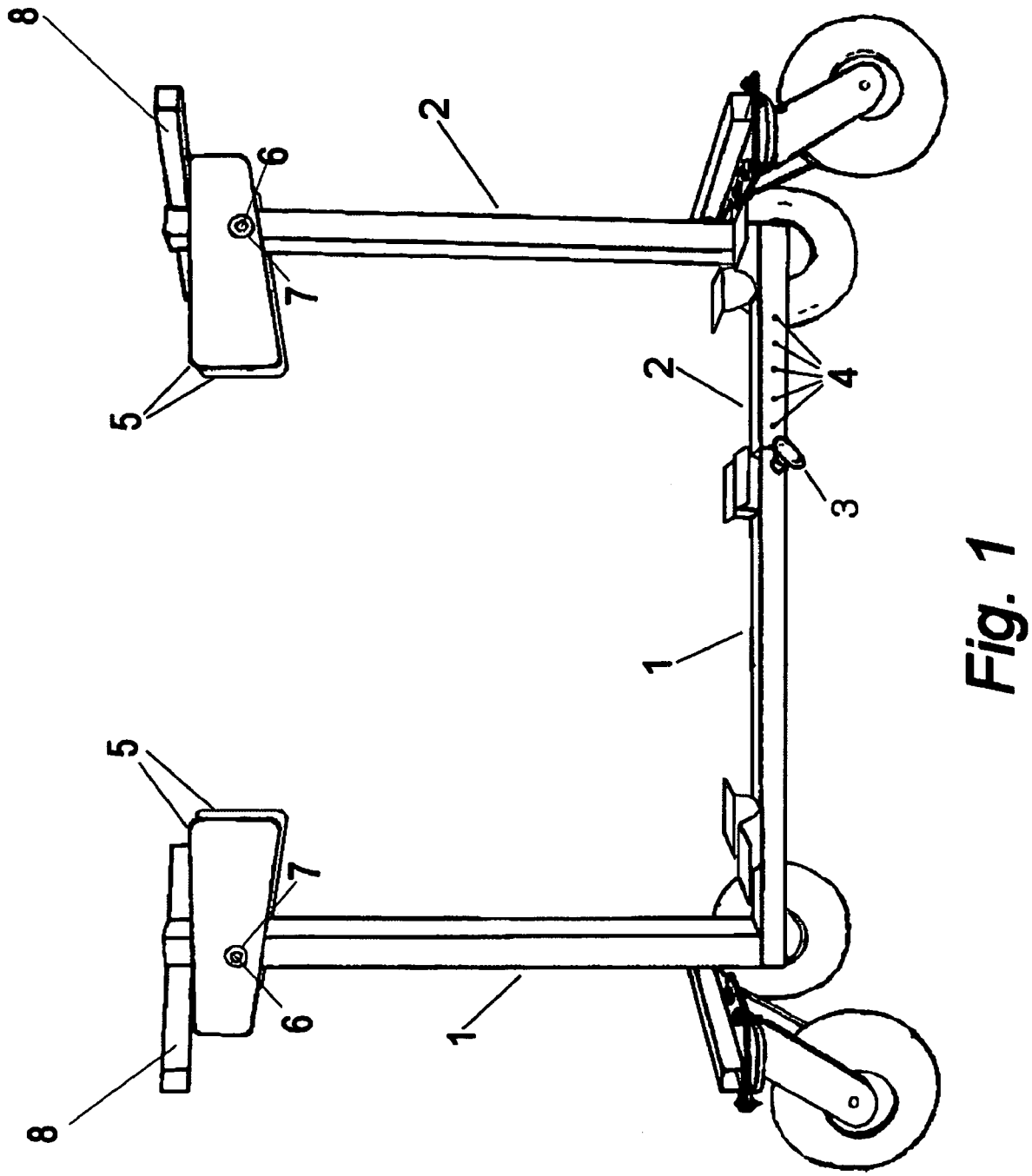
FIG. 1 is a three dimensional, side view of the expandable and retractable cart in a partially expanded state according to the present invention.
Figure 10:
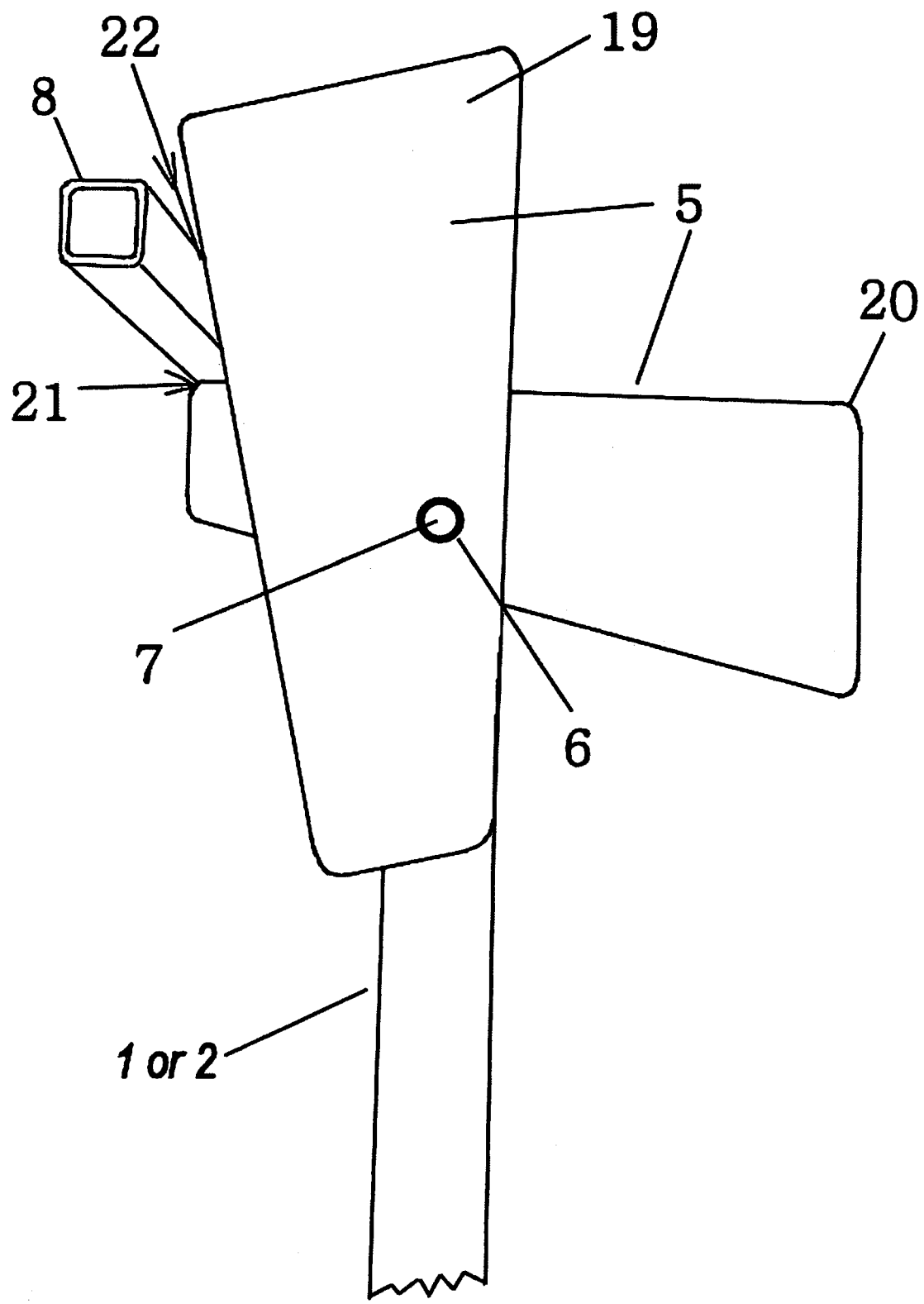
FIG. 10 is a three dimensional, side perspective view of the upper moveable support flags. The forward support flag is in an up or load position and the rear support flag is in a down or support position according to the present invention.

Referring to FIG. 1: Shows a partially extended cart according to a preferred embodiment of the present invention wherein all upper supports or pivotable support flags (5) are in the lowered position. Pivoting on pivot bolt (6) tensioned by spring washer (7). The rear top of support flags (5) butt up against the bottom of handles (8) holding them in place. Dropping out of place, is prevented by spring washer (7). Better detail of this is shown in FIG. 10 detailed description. Spring loaded locking pin (3) on lower, horizontal section of L frame (1) is in a locked condition through locking holes (4) on opposite lower, horizontal section of L frame (2) securing width of carrier in a partially expanded state.

Figure 2:
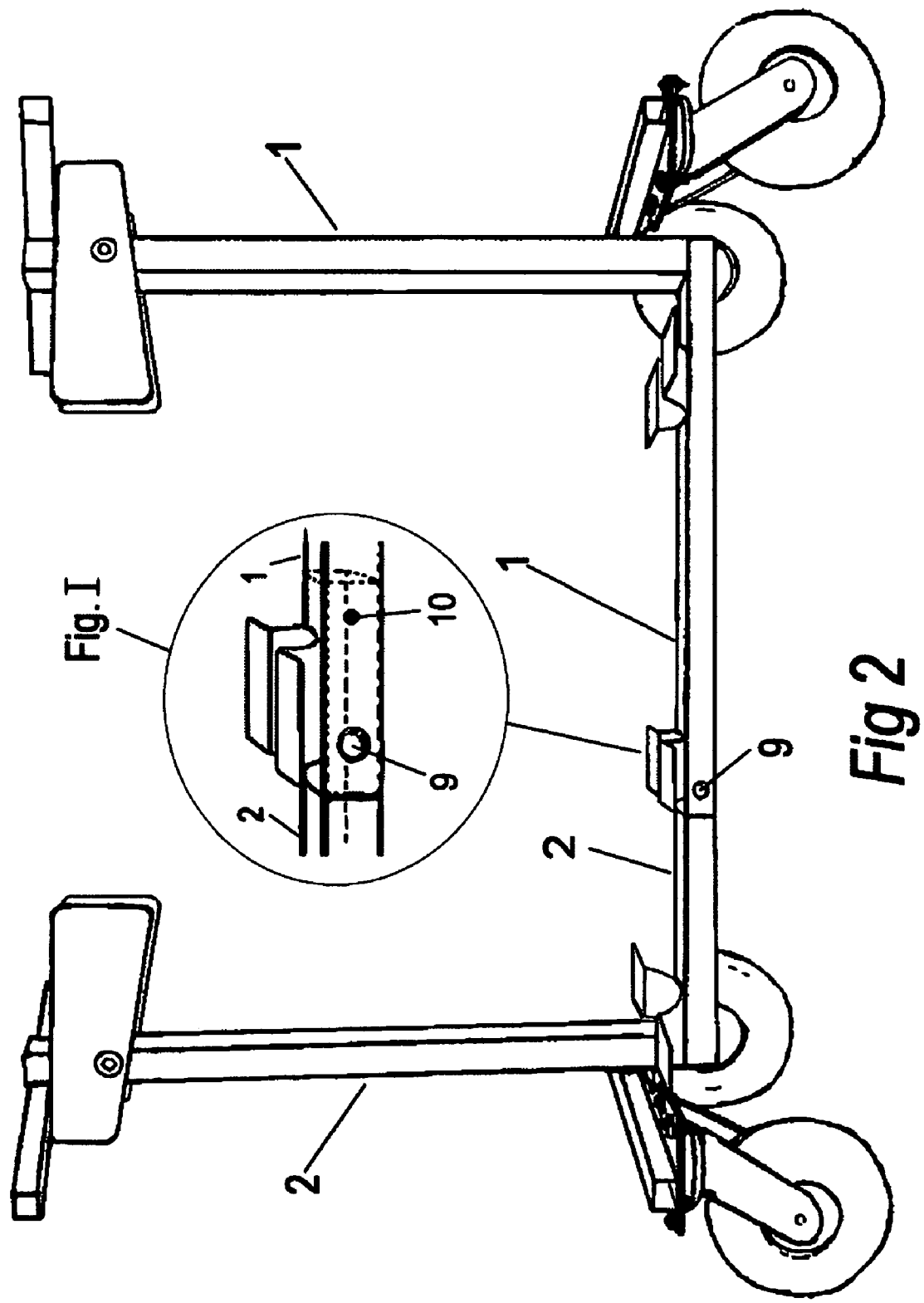
FIG. 2 is a three dimensional, opposite side view of the expandable and retractable cart in a partially expanded state according to the present invention.

Referring to FIG. 2: Shows the opposite side of a partially extended cart according to a preferred embodiment of the present invention wherein safety locking pin (9) in lower horizontal section of L frame (1) is shown riding on surface of lower horizontal section of L frame (2) in an unlocked condition. Referring to expanded view (FIG. I) this side of lower frame section (2) has only one safety hole (10) in the end of the lower, horizontal section of L frame (2). When cart is fully expanded, spring loaded safety pin (9) drops into safety hole (10) on the side of lower horizontal section of L frame (2), preventing both L frames (1) and (2) from coming apart accidentally.

Figure 3:
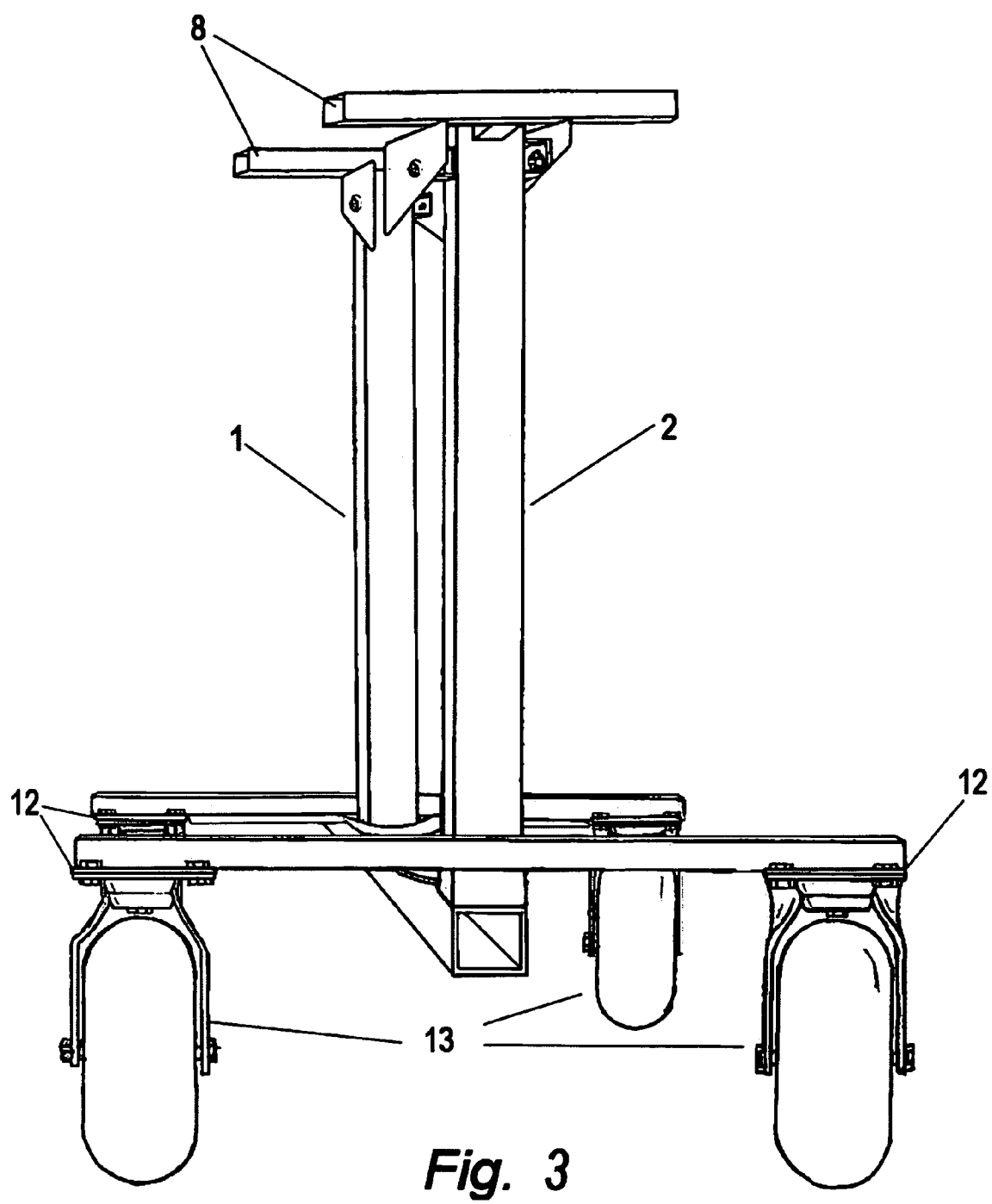
FIG. 3 is a three dimensional, perspective end view of the expandable and retractable cart; the other end view is the same according to the present invention.

Referring to FIG. 3: Shows an end view of cart according to a preferred embodiment of the present invention wherein upper, vertical sections of L frames (1) and (2) with handles (8) mounted at the top, showing upper support flags in loaded position against handles (8), wheel or caster (13) supports (11) with mounting pads (12) on each end, mounted at the lower end of the vertical sections of L frames (1) and (2).

Figure 4:
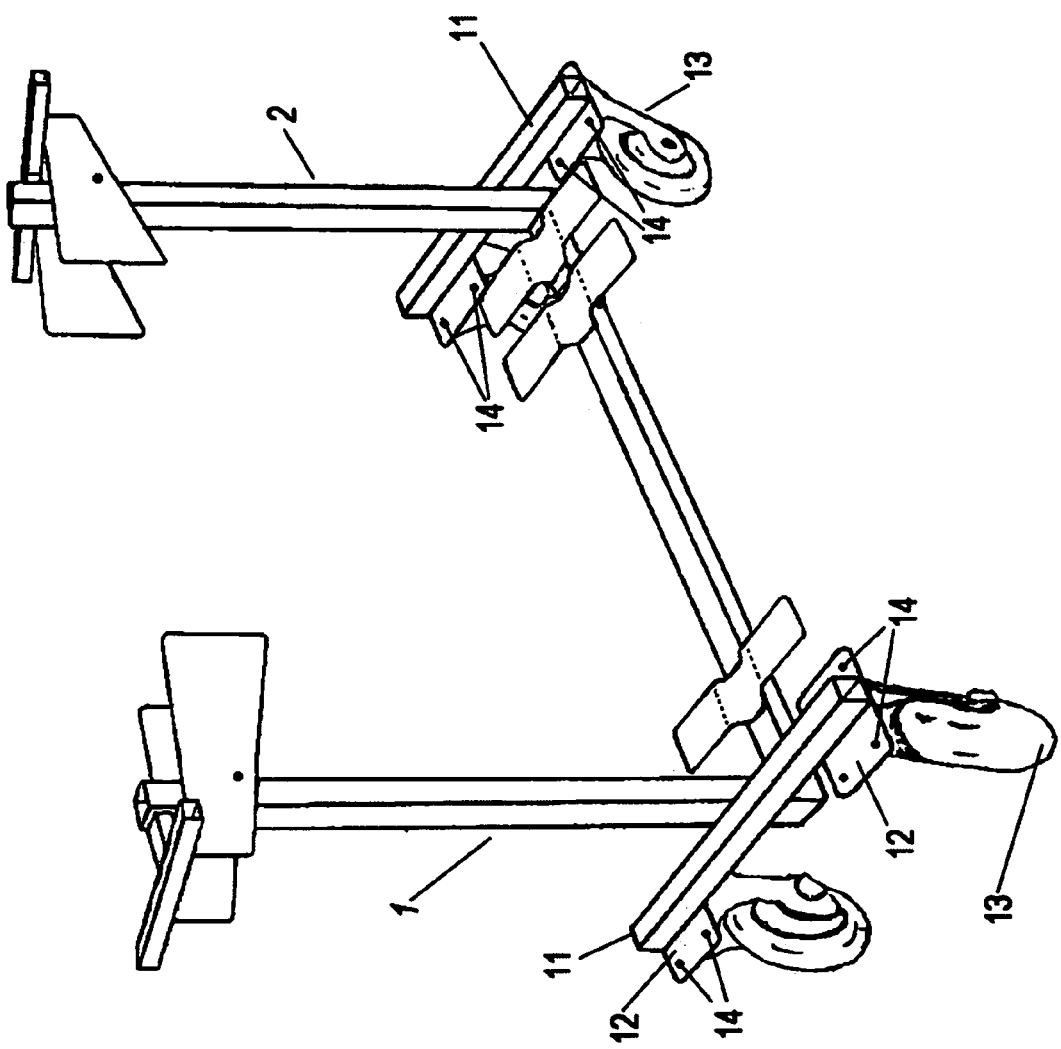
FIG. 4 is a three dimensional, side perspective view of the expandable and retractable cart in a fully retracted state according to the present invention.

Referring to FIG. 4: Shows a side perspective view of a fully retracted cart according to a preferred embodiment of the present invention wherein wheel or caster (13) mounting pads (12) with mounting holes (14), mounted to wheel supports (11). The end user can choose bolt, adhesive or weld on wheels or casters (13) of sufficient size and strength to hold the necessary weight of the cart and load.

Figure 5:
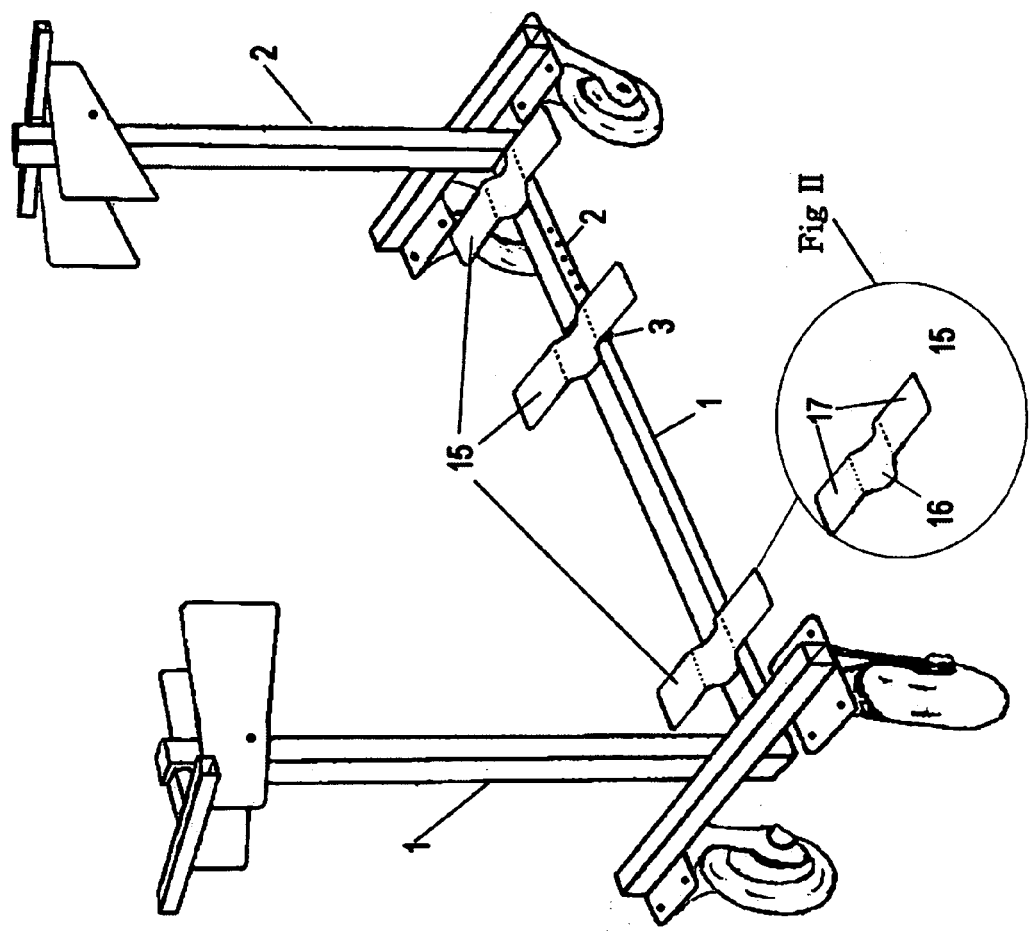
FIG. 5 is a three dimensional, side perspective view of the expandable and retractable cart in a partially expanded or retracted state according to the present invention.

Referring to FIG. 5: Shows a side, perspective view of a partially retracted and or partially extended cart according to a preferred embodiment of the present invention wherein the bottom load supports (15) mounted to lower, horizontal frame sections of L frames (1) and (2). Shown in expanded view (FIG. II), the detail of the bottom load supports (15) is shown: The center cupped or concave section (16) is to hold the unpackaged or thin unit. The center cupped or concave section is to prevent sideways, horizontal slippage of the unit. The outside end flat sections (17) is to hold or rest a wider or packaged unit.

Figure 6:
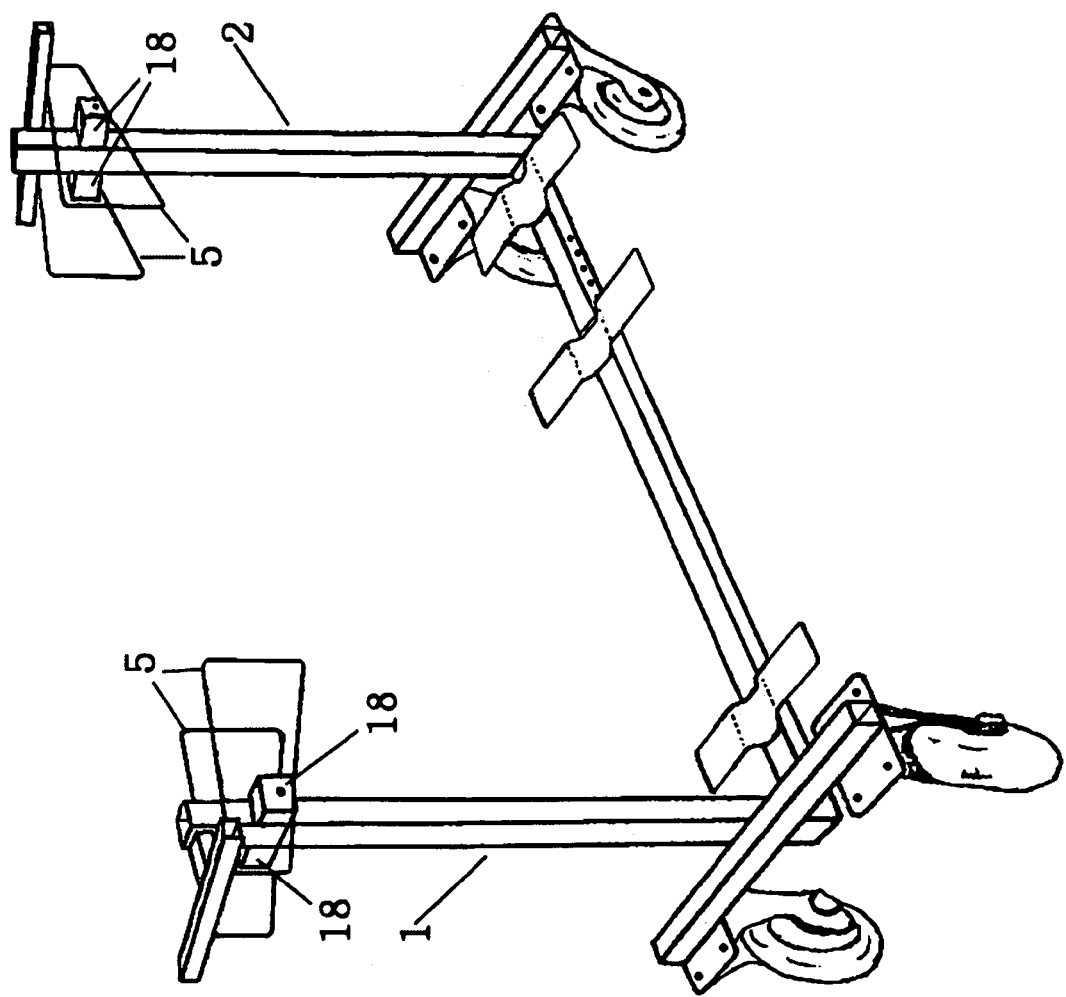
FIG. 6 is a three dimensional, side perspective view of the expandable and retractable cart with transparent, upper, moveable supports to give view of the construction behind them in a partially expanded or retracted state according to the present invention.

Referring to FIG. 6: Shows a side, perspective view of a partially retracted, partially extended cart according to a preferred embodiment of the present invention wherein the upper support flags (5) are shown in a transparent condition to show upper support flag mounts (18) behind them, this is used to attach the upper support flags (5) to the horizontal sections of main L frames (1) and (2).

Figure 7:
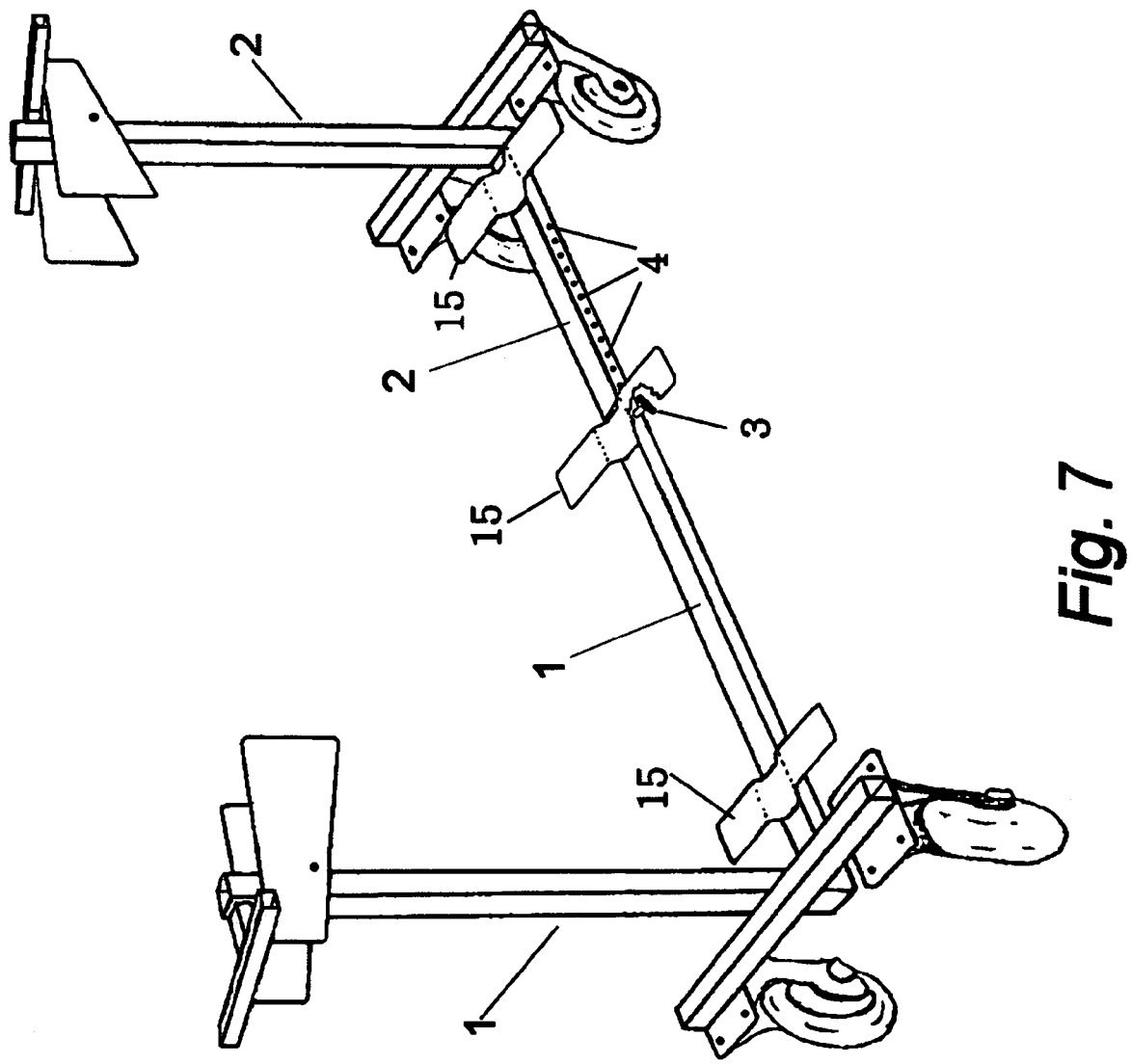
FIG. 7 is a three dimensional, side perspective view of the expandable and retractable cart in a fully expanded state according to the present invention.

Referring to FIG. 7: Shows a side, perspective view of a fully extended cart according to a preferred embodiment of the present invention wherein a cutaway view of the center bottom load support (15) showing locking pin (3) according to a preferred embodiment of the present invention, wherein locking pin (3) is in the last hole (4) of lower horizontal frame section of L frame (2) which slides into lower horizontal section of main L frame (1).

Referring to FIG. 8: The components of the cart shown in a side perspective exploded view of the cart according to a preferred embodiment of the present invention wherein the structure of the cart comprises of two main parts, namely the L frame sections (1) and (2). Expanding or collapsing the width of the cart is performed by L frame section (2) sliding inside of L frame section (1). Securing a desired width is accomplished when spring loaded locking pin (3), which is attached to L frame (1), drops into one of the holes (4). The prevention of the cart being extended beyond its limits is accomplished by safety pin (9). The load will rest on platforms (15). The upper end or top of the load is held in place by support flags (5) being pivoted into place on pivot pins (7), tensioned by spring washers (6), held on by locking nuts (19). The cart can be pushed or pulled using handles (8) rolled on a wide option of wheels (13) that are mounted on wheel mounting pads (12) which are attached to wheel supports (11).

Referring to FIG. 9: Shows a reverse, side perspective, exploded view of the cart according to a preferred embodiment of the present invention wherein safety spring loaded pin (9), mounted in hole (19) on the lower horizontal section of L frame (1), drops into safety hole (10) which is on the lower, horizontal section of L frame (2). This is to prevent the cart from coming apart if user overshoots maximum expansion using locking pin (3).

Referring to FIG. 10: Shows a side view of the upper support flag section of the cart according to a preferred embodiment of the present invention wherein the forward flag (19) is in the up or load unload position resting against point (22), the handle (8), to hold it into position, pivoting on pivot bolt (7) with tension from spring washer (6) giving friction of movement that prevents flags (5) from dropping or shifting out of place. Rear flag (20) is in the down or support/loaded position resting against point (21) the underside of handle (8) to hold it into position also using pivoting bolt (7) with tension from spring washer (6) giving friction of movement that prevents flags (5) from dropping or shifting out of place. Upper support flag sections on the vertical section of L frames (1) and (2) are the same. Many changes and modifications in the described embodiment of the invention herein can of course be carried out without departing from the true spirit and scope thereof. Accordingly, to promote the progress in science and the useful arts, the invention is disclosed and is intended to be limited only by the scope of the appended claims.

FIELD OF THE PRESENT INVENTION

The present invention relates to an expandable cart to safely transport thin, fragile monitors of varying length. The cart of the present invention is a novel, practical and safe transportation means, which has the advantages of easy operation, simple in construction and suitable for safely carrying monitors of various weights and sizes.

Field of Search

280/47.35, 638, 35, 33.99 R, 33.99 S, 33.991, 33.997 211/ 194, 208, 190, 27 108/106, 148 414/10, 11 280/79.7, 79.3, 79.2, 47.34, 74.731 211/182, 189, 50, 206

REFERENCES CITED

U.S. Pat. No. 4,793,624 Dec. 27, 1988 Mace 280/47.16; 280/ 47.2; 280/47.34; 280/79.7; D34/12; D34/24
U.S. Pat. No. 5,280,933 Finneyfrock Jan. 25, 1994 280/47.34; 211/49.1; 280/79.3
U.S. Pat. No. 4,326,731 Woychio, Spector Apr. 27, 1982 280/641; 211/198; 280/47.34; 280/639; 312/258; 403/95
U.S. Pat. No. 4,523,768 Dlubala Jun. 18, 1985 280/42; 211/ 195; 211/201; 280/79.11; 280/651
U.S. Pat. No. 4,679,805 Cunningham Jul. 14, 1987 280/ 33.991; 108/91; 211/149; 280/47.34; 280/79.3
U.S. Pat. No. 3,841,651 Oct. 15, 1974 Bigney 280/47.16
U.S. Pat. No. 6,786,503 May 2002 Young 280/656; 280/35; 280/79.11; 280/79.3; 280/651
U.S. Pat. No. 6,032,966 February 1998 Young 280/79.7; 280/ 47.34; 280/79.3; 414/11
U.S. Pat. No. 4,895,381 July 1998 Farlow 280/33.997; 108/ 106; 108/148; 211/27; 211/190; 211/208; 280/35; 280/ 47.35; D34/21
U.S. Pat. No. 5,228,716 September 1992 Ward 280/79.7; 269/17; 269/905; 280/47.2; 280/47.28; 280/47.35; 414/ 446; 414/490
U.S. Pat. No. 5,765,843 January 1996 Miller 280/79.7; 280/ 43.1; 280/47.16; 280/47.2; 280/47.29
U.S. Pat. No. 5,911,424 May 1995 Rovinsky 280/79.11; 280/ 655.1
U.S. Pat. No. 6,024,376 May 1997 Golichowski, Presnell 280/655.1; 16/35R; 280/79.11; 280/655
U.S. Pat. No. 6,079,941 August 1995 Lee 414/812; 16/35R; 280/79.11; 280/656; 414/537
U.S. Pat. No. 6,299,184 January 2000 Krawczyk 280/79.2; 280/651; 410/66
U.S. Pat. No. 6,488,304 August 2001 Krawczyk 280/408; 280/651; 280/654
U.S. Pat. No. 6,536,796 July 2001 Solomon 280/651; 280/ 47.34; 280/655
U.S. Pat. No. 6,877,764 June 2002 Sagol 280/655.1; 280/ 47.371; 280/79.11; 280/655
U.S. Pat. No. 5,816,604 May 1997 Hsieh, Hsieh 280/655.1; 280/33.997; 280/659

What is claimed is:

1. A cart for storing, moving, and servicing a flat panel or thin monitor, said cart comprising:
    a body including a first L-shaped frame and a second L-shaped frame, each said L-shaped frame defined by a lower horizontal section and an upper vertical section, wherein said horizontal sections of said L-shape frames are telescopingly connected to each other defining an adjustable beam, said beam includes a locking assembly including a plurality of locking holes and a locking pin for engaging said locking holes, said adjustable beam allowing the distance between the vertical sections of the L-shaped frames to be adjusted and locked in position by said locking means, a trio of transverse platforms for supporting said monitor, each platform having a concave center section and flat sections on either side of said concave section, a first and second of said platforms being located at each end of the beam and a third of said platforms being located in between said first and second platforms, a transverse wheel support on the lower end of each vertical section of the L-shape frames at a position above said adjustable beam, wherein each end of said transverse wheel supports includes a wheel or caster for transporting the cart along a support surface, a transverse handle on the upper end of each vertical section of the L-shape frames, and a pivoting flag assembly on the upper end of each vertical section of the L-shape frames, each said pivoting flag assembly including a pair of parallel flag members, each flag member pivotally mounted to flag mounts located on either side of the vertical section of the L-shape frames at a position below the handles, wherein said flag members pivot between a vertical position in which the flag members engage an inside surface of the handles, and a horizontal position in which the flag members engage a bottom side of the handles.

* * * * *